(No Model.)

M. SUSSMANN.
SECONDARY BATTERY.

No. 556,782. Patented Mar. 24, 1896.

Witnesses
B. S. Ober.
M. J. L. Higgins

Inventor
Max Sussmann

UNITED STATES PATENT OFFICE.

MAX SUSSMANN, OF NEU-RUPPIN, GERMANY, ASSIGNOR TO THE ELECTRIC EXPLOITATION COMPANY, LIMITED, OF LONDON, ENGLAND.

SECONDARY BATTERY.

SPECIFICATION forming part of Letters Patent No. 556,782, dated March 24, 1896.

Application filed May 15, 1895. Serial No. 549,593. (No model.) Patented in England March 30, 1893, No. 6,780.

*To all whom it may concern:*

Be it known that I, MAX SUSSMANN, a subject of the German Emperor, residing at Neu-Ruppin, in the German Empire, have invented new and useful Improvements in Secondary Batteries, (for which I have obtained a patent in Great Britain, No. 6,780, bearing date March 30, 1893,) of which the following is a specification.

The active material made according to this invention and used in connection with a suitable lead conductor to form a "plate" is very porous, while firmly adhering to the conductor.

The material I use for making up the plate is in the condition of a very fine powder. This material may be metallic lead or lead-oxide or any other salt of lead or other suitable metal or metallic salt. This powdered material I mix intimately with a solution of gutta-percha or of india-rubber, so as to form a thick paste, the solvent employed being a volatile hydrocarbon, sulphide of carbon or the like, the solution being mixed with very finely-powdered pumice-stone or other suitable inert porous material, say about five to fifteen per cent. of the bulk of the composition. The pumice-stone imparts a beneficial porosity to the compound. The compound so made forms the active material in the paste condition ready for application. It is applied to both sides of a lead conductor, by preference provided with apertures through it, whereby the active material on both sides is well keyed together, and I then compress it.

In the construction of my improved electrode for secondary batteries I employ a conductive core of sheet-lead or other suitable material of any desired thickness and rip it up—that is to say, provide it with small incisions—and then by means of suitable tools push out the pieces in opposite directions, so that the two surfaces of the article are formed with teeth or tongues of triangular, rectangular, or of other suitable form, and bent into hook shape or not.

Figure 1:
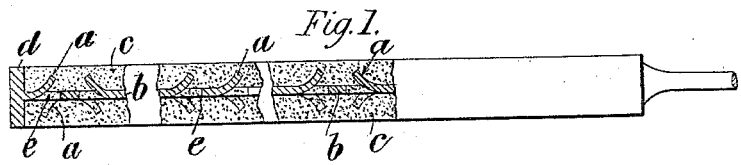
Figure 2:
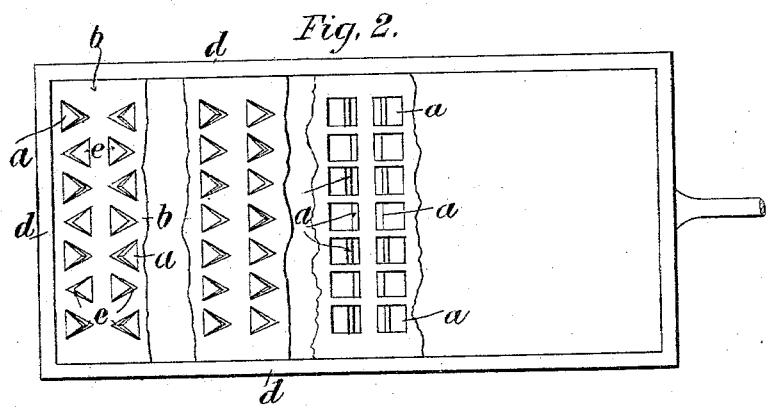

Figure 1 is a part-sectional side view of a plate with such a conductor, and Fig. 2 a part-sectional plan view of same.

I have here shown as examples two modes of arranging the triangular teeth or tongues and one form of square teeth. The teeth or tongues *a* may, as shown, be merely bent up from the body *b* of the conductor or bent up and curved. The active material *c* is applied to both sides of the conductor by preference in a thickness somewhat exceeding the height of the teeth. The whole is then compressed in a suitable mold, so that the active material comes about level with the upstanding edges *d* surrounding body *b* of the conductor on both sides, the whole of the active material *c* forming a homogeneous block. The teeth or tongues *a* not only serve to grip and hold the material *c* together, but also form an extended conducting-surface distributed throughout the mass of the material, those portions of the latter which are in the holes *e* forming keys that bind the material on both sides of the conductor together and allowing the exciting liquid to generate. A plate of this construction not only contains a large amount of active material, but the conductor also presents a large active surface, while the material is well kept in place. It thus possesses great superiority to the plates with gridiron form of conductor, where the material is much less in quantity and the conductor, while larger in bulk, presents a comparatively small surface.

Plates made according to this invention are moreover very light and strong and possess the special advantage that they can be charged and discharged at a very high rate.

The solvent having evaporated the plate is ready for use.

In case a salt of lead is used for the active-material composition the plate made as described is plunged into a suitable bath to reduce the lead-salt into metallic spongy lead.

What I claim as my invention, and desire to secure by Letters Patent, is—

1. An electrode for secondary batteries, comprising a sheet-metal conductive core and an active material consisting of a paste composed of a plumbic material and pumice-stone in a finely-divided state, and a solution of rubber, substantially as set forth.

2. An electrode for secondary batteries comprising a sheet-metal conductive core $b$, provided with an encompassing rim or flange $d$, teeth $a$, and apertures $e$, and an active material applied to both faces of and filling the apertures in said core, said active material consisting of a paste composed of an intimate admixture of a finely-divided inert porous substance and a plumbic material, with a solution of rubber, substantially as set forth.

MAX SUSSMANN.

Witnesses:
V. C. DOUBLEDAY,
HUGH HUGHES.